United States Patent Office 3,220,868
Patented Nov. 30, 1965

3,220,868
LIGHT- AND WEATHER-RESISTANT YELLOW CADMIUM PIGMENT
Helmut Flasch, Leverkusen, Germany, assignor to Farbenfabriken Bayer Aktiengesellschaft, Leverkusen, Germany, a corporation of Germany
No Drawing. Filed June 20, 1962, Ser. No. 203,755
Claims priority, application Germany, July 3, 1961, F 34,324
7 Claims. (Cl. 106—301)

The present invention relates to a new compound, a yellow cadmium pigment in which selenium and zinc are incorporated into the cadmium-sulfide-lattice.

It is an object of the present invention to produce a light- and weather-resistant yellow cadmium pigment.

The pure or blended cadmium yellow pigments on the market contain either CdS or mixed crystals of CdS and ZnS as pigment carriers. In contrast to the very stable cadmium red pigments, the cadmium yellow pigments available commercially have the great disadvantage that, particularly in white blends in a number of plastics (e.g., PVC, acetyl cellulose), lacquers and aqueous binding agents they are insufficiently light-resistant and weather-resistant.

A process has become known by which the light-resistance and weather-resistance of cadmium yellow may be improved by the incorporation of small quantities of selenium into the CdS lattice. Although a certain improvement in the resistance to light and weather is obtained by this process, it is not sufficient for all purposes.

The yellow cadmium pigments having incorporated zinc and selenium into the cadmium-sulfide lattice according to the present invention are fast to light and weather in all plastics and binding agents. Beautiful shades of light- and weather-resistant pigments are obtained with a selenium concentration in the range between about 1.5 and about 9 percent and with a zinc concentration in the range between about 7 and about 20 percent.

The following table shows the principal differences in composition between the weather-resistant yellow pigments manufactured by the process of the invention and the commercial cadmium yellow and cadmium red pigments or the selenium-containing CdS yellow pigment.

| | Cd | Zn | S | Se |
|---|---|---|---|---|
| Cd yellow pigments: | | | | |
| (a) Golden yellow | X | | X | |
| (b) Greenish tinge | X | X | X | |
| (c) Selenium-containing yellow | X | | X | X |
| (d) Yellow according to the invention | X | X | X | X |
| Cd red pigments | X | | X | X |

As the table shows, only the cadmium yellow types manufactured in accordance with the invention are composed of all the four components Cd, Zn, S and Se. All the other cadmium pigments contain only two or three of the said components.

Good fastness to light and weather is obtained in cadmium yellow pigments manufactured by the present process when the pigments contain, for example, 1.5% Se and 7% Zn. Excellent results are obtained with golden yellow types which contain 5% Se and 13% Zn. With higher selenium and zinc contents, clear cadmium yellow pigments are obtained in beautiful colours and are particularly fast to light and weather.

The light- and weather-resistant cadmium yellow pigments may be prepared, for example, by intimately mixing powdered cadmium sulphide, zinc sulphide and cadmium sulphoselenide and then heating the mixture for several hours to, for example 600° C.

The light- and weather-resistant cadmium yellow pigments are preferably prepared from solutions containing cadmium and zinc salts. For example, aqueous solutions containing $CdSO_4$, $Cd(NO_3)_2$ and $ZnSO_4$ may be precipitated with sodium carbonate solution and the resulting carbonate paste may be decanted and treated with a $Na_2S$ solution which contains selenium in solution. Solutions containing $CdCl_2$ and $ZnCl_2$ may be treated directly with a BaS solution which contains selenium in solution.

The crude pigments obtained by the above process are washed, pressed, dried, and heated in the absence of air to obtain the optimum grain size. The heated material is then ground wet, pressed and dried.

Example 1

1 litre of an aqueous solution containing 126 grams $CdSO_4$, 67.5 grams $Cd(NO_3)_2$ and 49 grams $ZnSO_4$ is treated with a sodium carbonate solution containing 100 grams of $Na_2CO_3/l$. until the reaction is alkaline.

A sodium sulphide-selenium solution obtained by dissolving 158.7 grams of 60% sodium sulphide and 7.93 grams of selenium in 1 litre of water is heated to 70° C. and added to the decanted paste of $CdCO_3$ and $ZnCO_3$ while stirring constantly. The reaction mixture is kept at 70° C. for 3 hours and the pigment paste is then separated by suction filtration, washed and dried.

The crude pigment is heated for 4 hours at 600° C. while excluding air. The heated material is chilled in water, ground wet, pressed, washed and dried. 160 grams of a brilliant cadmium yellow fast to light and weather are obtained.

Example 2

1.120 litre of an aqueous solution containing 183 g. $CdCl_2$ and 70 g. $ZnCl_2$ is treated with a sodium carbonate solution containing 100 g. $Na_2CO_3$ per litre until the reaction is alkaline.

To the decanted paste of $CdCO_3$ and $ZnCO_3$ a sodium sulphide selenium solution of 70° C. is added while stirring constantly. The solution is obtained by dissolving 184 g. of 60% sodium sulphide and 13.6 g. of selenium in 1 litre of water. The reaction mixture is kept at 70° C. for 3 hours and then treated as described in the preceding example. 192 g. of a brilliant green greenish tinged, light- and weather-resistant cadmium yellow pigment are obtained, containing about 6.3% of Se and 14.2% of Zn.

I claim:
1. A cadmium sulfide yellow pigment having excellent fastness to light and very good stability to atmospheric influences consisting essentially of a cadmium sulfide pigment having incorporated into the cadmium sulfide crystal lattice between about 1.5 and about 9% of selenium and between about 7.0 and 20% of zinc.

2. Yellow cadmium sulfide pigment as claimed in claim 1 wherein 1.5% selenium and 7% zinc are incorporated into the cadmium sulfide lattice.

3. Yellow cadmium sulfide pigment as claimed in claim 1 wherein 5% selenium and 13% zinc are incorporated into the cadmium sulfide lattice.

4. Yellow cadmium sulfide pigment as claimed in claim 1 wherein 6.3% selenium and 14.2% zinc are incorporated into the cadmium sulfide lattice.

5. A method of preparing a yellow cadmium sulfide pigment having excellent fastness to light and very good stability to atmospheric influences, which comprises preparing an intimate mixture of powdered cadmium sulfide, zinc sulfide to produce a final product containing between about 1.5 and about 9% of selenium and between about 7 and 20% of zinc cadmium sulfoselenide and heating said mixture for several hours to temperatures of about 600° C.

6. The method of preparing a yellow cadmium sulfide pigment having excellent fastness to light and very good stability to atmospheric influences, comprising treating an aqueous solution containing $CdSO_4$, $Cd(NO_3)_2$ and $ZnSO_4$ with a solution of sodium carbonate, contacting the precipitate thereby formed with an $Na_2S$ solution containing selenium and recovering the yellow cadmium sulfide pigment containing between about 1.5 and about 9% of selenium and between about 7 and 20% of zinc thereby formed.

7. The method of preparing a yellow cadmium sulfide pigment having excellent fastness to light and very good stability to atmospheric influences, comprising contacting an aqueous solution containing $CdCl_2$ and $ZnCl_2$ with a solution of BaS containing selenium and recovering the yellow cadmium sulfide pigment containing between about 1.5 and about 9% of selenium and about 7 and 20% of zinc thereby formed.

References Cited by the Examiner

UNITED STATES PATENTS 2,605,167  7/1952  O'Brien _____ 106—301

TOBIAS E. LEVOW, *Primary Examiner.*